United States Patent [19]

Linkowski

[11] Patent Number: 4,644,541

[45] Date of Patent: Feb. 17, 1987

[54] DIAGNOSTIC TEST FOR PROGRAMMABLE DEVICE IN A MAILING MACHINE

[75] Inventor: William J. Linkowski, Poughquag, N.Y.

[73] Assignee: Pitney Bowes Inc., Stamford, Conn.

[21] Appl. No.: 692,752

[22] Filed: Jan. 18, 1985

[51] Int. Cl.[4] .................... G06F 15/20; G06F 11/00

[52] U.S. Cl. .................... 371/20; 364/464; 371/21; 371/29

[58] Field of Search .................... 371/20, 21, 25, 29; 364/464, 900

[56] References Cited

U.S. PATENT DOCUMENTS

| | | | |
|---|---|---|---|
| 3,838,264 | 9/1974 | Maker | 371/21 |
| 4,122,996 | 10/1978 | Wilczek | 371/20 |
| 4,280,180 | 7/1981 | Eckert et al. | 364/464 |
| 4,302,821 | 11/1981 | Eckert et al. | 364/900 |
| 4,498,187 | 2/1985 | Soderberg et al. | 364/464 X |
| 4,523,460 | 6/1985 | Strickler et al. | 364/509 X |
| 4,525,785 | 6/1985 | Soderberg et al. | 364/464 |
| 4,535,407 | 8/1985 | Eckert et al. | 364/464 |

*Primary Examiner*—Charles E. Atkinson
*Attorney, Agent, or Firm*—Donald P. Walker; David E. Pitchenik; Melvin J. Scolnick

[57] ABSTRACT

Diagnostic test method and apparatus for testing the contents of a programmable device in a mailing machine. Upon initiation of the test sequence, each bit of the mailing machine programmable device under test is added in an accumulator and the resulting sum is displayed on the machine's control panel display. This value can then be checked against the expected value to detect errors or failure to install the latest update.

13 Claims, 10 Drawing Figures

DIAGNOSTIC TEST FOR PROGRAMMABLE DEVICE IN A MAILING MACHINE

This invention relates generally to the field of mailing machines and more particularly to a method and apparatus for diagnostic testing of the contents of a programmable device in a mailing machine.

Mechanical mailing machines comprising automatic letter feeding apparatus and postage metering and printing apparatus are in wide use. These prior art machines utilized primarily mechanical means to control feeding of documents for printing of metered postage impressions at the proper location on the document. This requires mechanical control means for maintaining and achieving registration of the printed impression with respect to each document as well as providing for the feeding of documents of variable lengths and thicknesses. Such mechanical control mechanisms are often unreliable, require frequent maintenance, and are largely non-programmable and require periodic adjustment and parts replacement due to aging and wear of mechanical parts.

A substantial number of the problems associated with these prior art devices can be avoided by use of digital electronic control systems which provide increased reliability and provide programmability by use of programmable components. Such programmable devices allow simple updating of system software and the flexibility to compensate for wear of mechanical components but create a need for a simple diagnostic testing system. In the prior art such testing has required a technician using specialized equipment.

It is accordingly an object of the invention to provide an improved system for diagnostic checking of proper function of programmable devices in a mailing machine.

It is another object of the invention to provide an improved diagnostic checking system for a programmable device in a mailing machine which is simple to utilize and which can operate in real time without requiring special equipment.

Briefly, according to one embodiment of the invention, apparatus for diagnostic testing of the contents of a programmable device in an automatic mailing machine is provided comprising control panel means, having a plurality of control switches and a visual display, for controlling the mailing machine functions in a normal mode of operation, and means for initiating a test mode in response to activating a selected key of the control panel means. In addition, means are provided for summing the contents of the programmable device to obtain a total sum value responsive to initiation of the test mode. Alternatively, the total sum value may be displayed on a visual display, or means may be provided to compare the total sum value to a predetermined check sum value and display an error indication in response to a difference.

BRIEF DESCRIPTION OF THE DRAWINGS

The invention, together with further objects and advantages thereof, may be understood by reference to the following description taken in conjunction with the accompanying drawings.

DETAILED DESCRIPTION OF THE PREFERRED EMBODIMENT

Figure 1:
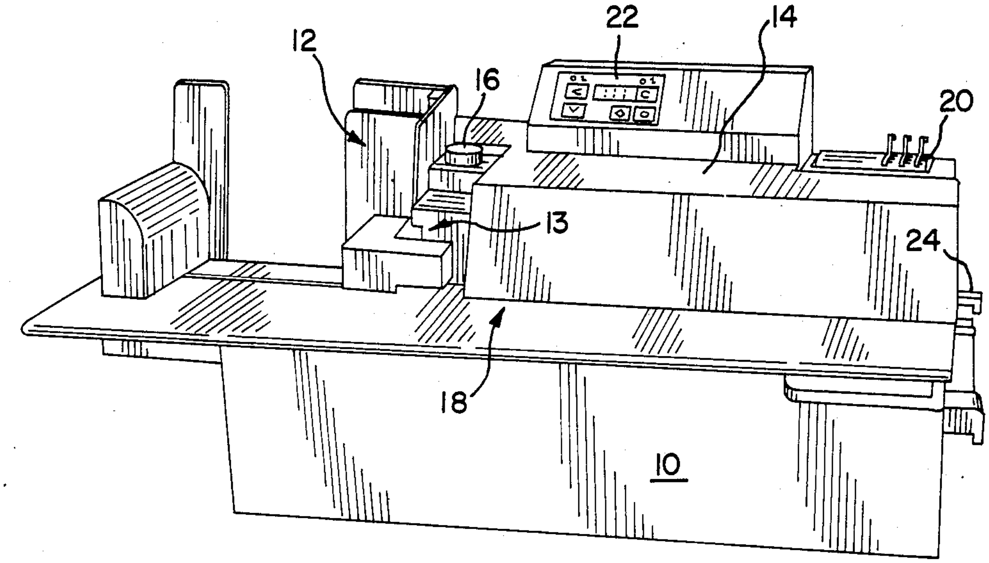
FIG. 1 is an illustration of a specific embodiment of a mailing machine in accordance with the invention.

FIG. 1 is an illustration of a specific embodiment of a mailing machine 10 utilizing the invention. The mailing machine 10 includes a document feeder bin 12 for holding documents for an automatic document feeder 13 which feeds to a conventional belt and roller document transport mechanism (not shown) contained within a housing 14. The document feeder 13 and transport mechanism are driven in the conventional manner by an electric drive motor (not shown) also contained within the housing 10. An adjustment knob 16 permits adjustment of the feeder 13 to provide for a range of envelope thicknesses. The transport mechanism utilizes a transport belt (not shown) to move each document along a document deck 18 to a postage meter 20 which, when activated, prints a postage indicia on the document and seals the document envelope. A control panel 22, including control keys and a visual display, provides for operator control of the mailing machine functions. A meter select lever 24 permits the meter to be disabled so as to only seal envelopes without printing a postage indicia and further permits the meter to be detached from the mailing machine. In the preferred embodiment, the postage meter is mechanical, but may also be electronic or partially electronic. A photo-sensor (not shown) located within the housing is utilized to detect the flow of documents through the transport mechanism.

Figure 2:
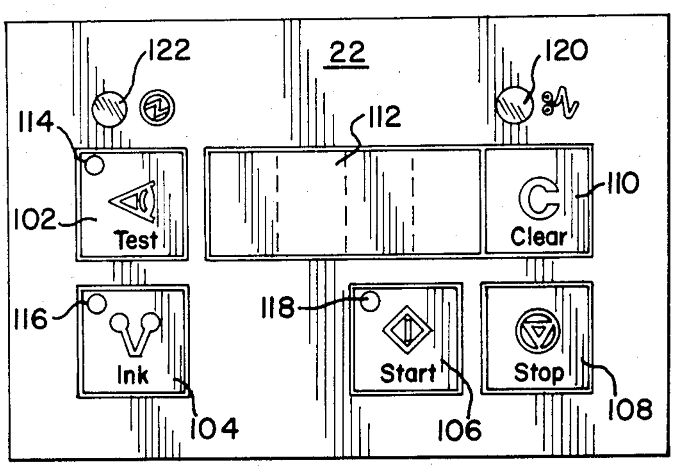
FIG. 2 is an illustration of a specific embodiment of a mailing machine control panel as shown in FIG. 1.

Referring now to FIG. 2, there is shown a mailing machine control panel 22 for providing operator control of mailing machine functions. The control panel 22 includes a test mode key 102 for activating a test mode, an ink key 104 for activating an ink solenoid to provide ink to the postage meter print mechanism, a start key 106 for starting the mailing machine, a stop key 108 for stopping the machine, and a clear key 110 for clearing a display 112. The display 112 is preferably a four digit light emitting diode (LED) display for displaying a piece count and diagnostic information. The test, ink and start keys each have an indicator light (e.g., an LED in the preferred embodiment), indicated by reference numerals 114, 116 and 118 respectively, to indicate to the operator when the associated key has been activated. A jam indicator 120 indicates when documents are jammed in the machine, and a power on indicator 122 indicates when power is applied to the mailing machine. In addition, a bank of switches (not shown) located under the control panel permit adjustment of the location of the printing of the postage indicia printed by the postage meter.

The mailing machine control panel 22 performs a dual function of providing control by an operator of mailing machine functions in a normal operating mode, and in a test mode provides control of diagnostic test procedures (i.e., the control panel keys serve as code entry keys for initiating tests). When an operator desires to test the mailing machine, the test key is depressed thereby switching the machine into a test mode. In the test mode the operator enters a password sequence (e.g., depressing the ink, stop, clear and ink keys in sequence) using the keys of the control panel thereby starting the test procedure. After entry of a valid password the display lights up with a signon message (e.g. HELP in the preferred embodiment) after which the operator can enter a test code using the various keys of the control panel to initiate a test. By this procedure the operator can start and monitor electrical or electromechanical devices of the mailing machine via the control panel using the LED display for output of information. To stop a test in progress the stop key is depressed which shuts down the test performed and displays "ENOO" on the visual display, which indicates that the system is ready to initiate another diagnostic test. To exit from the diagnostic test mode, the test key is depressed which enables the test indicator light and switches the system back to the normal mode of operation.

Figure 3:
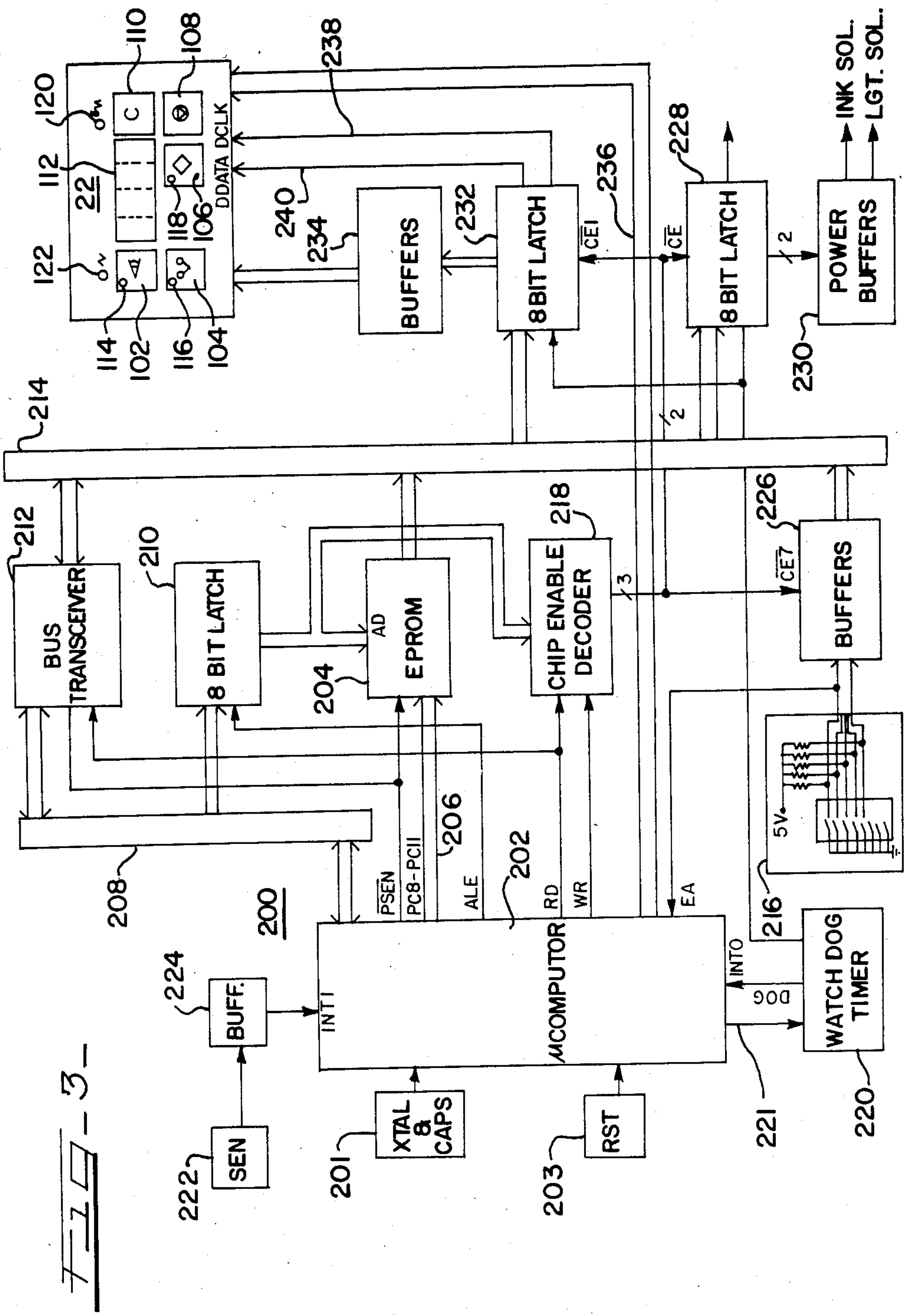
FIG. 3 is a detail block diagram of a specific embodiment of electronic control circuitry for a mailing machine in accordance with the invention.

Referring to FIG. 3, there is shown a detailed block diagram of a specific embodiment of control circuitry 200 for a mailing machine according to the invention. A microcomputer 202 (e.g., an Intel 8031) provides the central processing capability for the system with its internal oscillator regulated by a crystal and capacitor network 201 and power-up reset provided by a capacitor 203. An electrically programmed read only memory (EPROM) 204 provides field programmable program memory for the microcomputer 202. This programmable device (EPROM) 204 is addressed by the microcomputer 202 via an 8 bit address coupled through a bus 208 to an 8 bit latch 210 and via a 4 bit bus 206 from the upper byte of the address port of the microcomputer 202, as shown. The EPROM 204 is enabled by the program store enable signal (PSEN) and the latch 210 is strobed by the address latch enable strobe (ALE). The addressed data from the EPROM 204 is coupled upon being strobed by the PSEN signal to a data bus 214. A bidirectional bus transceiver 212 provides buffering for passing data between the bus 208 and the data bus 214, as shown, and is controlled by the PSEN signal and a read signal (RD) from the microcomputer 202. A chip enable decoder 218 is provided to generate enable signals to control several peripheral latches 228, 232 and buffer circuits 226, and is controlled by the microcomputer 202 via the RD signal, and a wire strobe (WR) as well as by 4 secondary address lines coupled from the latch 210, as shown. A conventional watchdog timer 220 (e.g. a monostable multivibrator) retriggered periodically (e.g. every 150 ms in the preferred embodiment) by the microcomputer 202 via a data line 221 is provided to generate watchdog signals which are coupled to the microcomputer external interrupt zero input (INTO), as well as to several latch circuits 228, 232, as shown. Thus, if the microcomputer 202 stops or hangs up, the watchdog timer interrupts the processor to allow a restart and inhibits the display and power latches 228, 232.

A letter sensor 222 (e.g., a photo-sensor) is provided for sensing the flow of documents through the mailing machine by generating an interrupt signal in response to detection of the leading edge of a document. This interrupt signal is coupled through a buffer 224 to the microcomputer external interrupt one input (INTI), as shown. In response to this interrupt, the microcomputer 202 waits for a fixed delay time (e.g. 40 ms in the preferred embodiment) during which time it reads data from a bank of data switches 216 which determines a programmable delay. This delay is added to the fixed delay and after the total delay period the microcomputer 202 energizes a letter solenoid (not shown). The letter solenoid activates the postage meter 20 causing the postage indicia to be printed. The photo-sensor signal from the trailing edge of the document is used by the microcomputer 202 to prepare for the next leading edge. If no trailing edge occurs for 400 ms, the processor generates a "jam" signal which activates the jam indicator 120. In addition to the letter solenoid, the microcomputer 202 controls an ink solenoid which supplies ink to the postage meter for 10 seconds in response to activation of the ink key 104. The signals for controlling these solenoids are coupled from the microcomputer 202 through the data bus 214 to a latch 228 and then through power buffers 230, as shown. In addition, some of the data coupled to the latch 228 is utilized to control the motor (not shown) which drives the document feeder and transport mechanism.

The switch bank 216 comprises a set of four switches (e.g., a DIP switch package in the preferred embodiment) which are coupled through a buffer 226 to the data bus 214, as shown, thereby providing binary coded switch data to the microcomputer 202 via the buses 214 and 208 and bus transceiver 212. This data is utilized by the microcomputer 202 to determine the amount of time delay between the sensing of the leading edge of a document through the transport mechanism of the mailing machine and the printing of the postage indicia on the document. Thus these selection switches permit an operator to adjust the delay and therefore control the indicia positioning. Since there are four switches configured for binary coding, there are a total of sixteen delay values selectable, with each value representing approximately one eighth of an inch shift (i.e., 2.5 ms delay) in the position of the printed indicia. In addition, a single line from a fifth switch in the bank of switches 216 is coupled to the EA input of the microcomputer 202 to provide the option of use of either an internal or an external read only memory.

The microcomputer 202 communicates with the control panel 22 via two paths: (1) a 6 bit data bus 236 and (2) a path through the latch 232 and buffer 234, as shown. The data bus 236 couples to a 3×3 keyboard matrix providing for input to the microcomputer 202 from a total of nine switches of which only five are presently used as described hereinbefore. In addition, 4 bits of data are coupled from the bus 214 through the latch 232 and buffers 234 to activate the test indicator light 114, the ink indicator light 116, the start indicator light 118, and the jam flow indicator light 120. Finally, the data DDATA on line 240 for display on the four digit LED display 112 is serially clocked into a set of display registers in the display by a DCLK signal on line 238.

Figure 4:
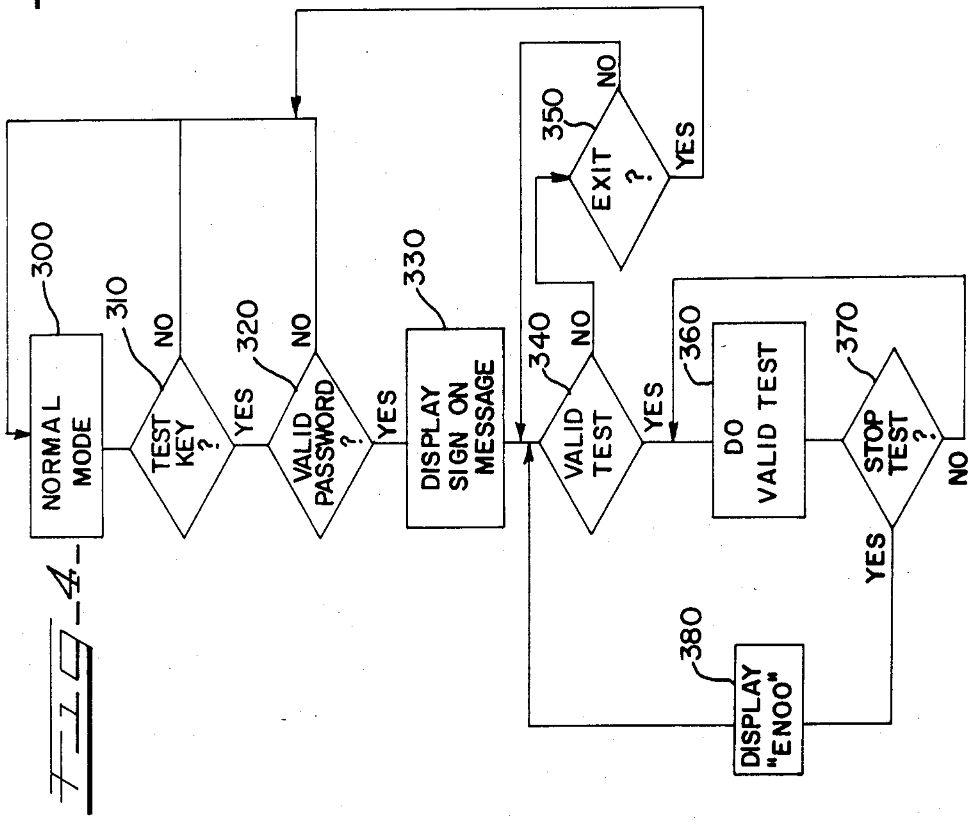
FIG. 4 is a flow diagram of a specific diagnostic test initiation sequence according to the invention.

FIG. 4 is an illustration of a flow diagram of a specific diagnostic test initiation sequence according to the invention. The test initiation sequence begins with software operating in a normal mode as indicated at 300. At block 310 a test is performed to determine whether the test key has been depressed. If not, the system returns to the normal mode and continues in normal operation. If the test key has been depressed, the system waits for entry of a password and then a logic test is performed to determine whether a valid password has been entered as illustrated at 320. If a valid password has not been entered, the system will return to a normal mode of operation, as shown. If the valid password has been entered a sign-on message will be displayed on the LED display on the control panel, as indicated at block 330. The system then waits for entry of a test selection code after which a "valid code" logic test will be performed to determine if a proper test code has been entered as illustrated at 340. If the proper test code has not been entered program control passes to block 350 to determine whether the test key has been depressed, which results in exit from the test mode and return to the normal mode. If the test key has not been depressed then the system will return to block 340 to continue to monitor for a valid test code. If a valid test code has been entered the system proceeds to perform the test according to the test code entered as indicated at block 360 and monitors the stop key to determine if the test is to be stopped as indicated at block 370 (FIGS. 5A to 5F are flow diagrams of some suitable tests). If at block 370 the test is to be stopped the system will return control to block 360, as shown. If the stop button has been depressed the test will be stopped and the display will exhibit a stopped test indicator as shown at block 380 (e.g., "ENOO" in the preferred embodiment). Program control then passes back to block 340 permitting exit from the test mode by depressing the test key or permitting another test to be performed by the entry of a valid test code.

There are numerous tests which can be implemented with the disclosed system. However, in the preferred embodiment, six tests have been implemented. A test of the LED display and LED indicator lights is initiated by depressing the ink key twice and then the start key (i.e., the test code for the display test in the preferred embodiment) which will initialize all segments of the LED display with a count of 0000 and turn all the LED indicators on simultaneously (see FIG. 5A). The test will then proceed by successively turning off each LED and incrementing all four digits of the display until each LED has been turned off and the display reads 4444. The LEDs are then turned on again, the display incremented and the procedure repeated until the display reads 9999. This entire procedure continues to repeat until the stop key is depressed.

Figure 5C:
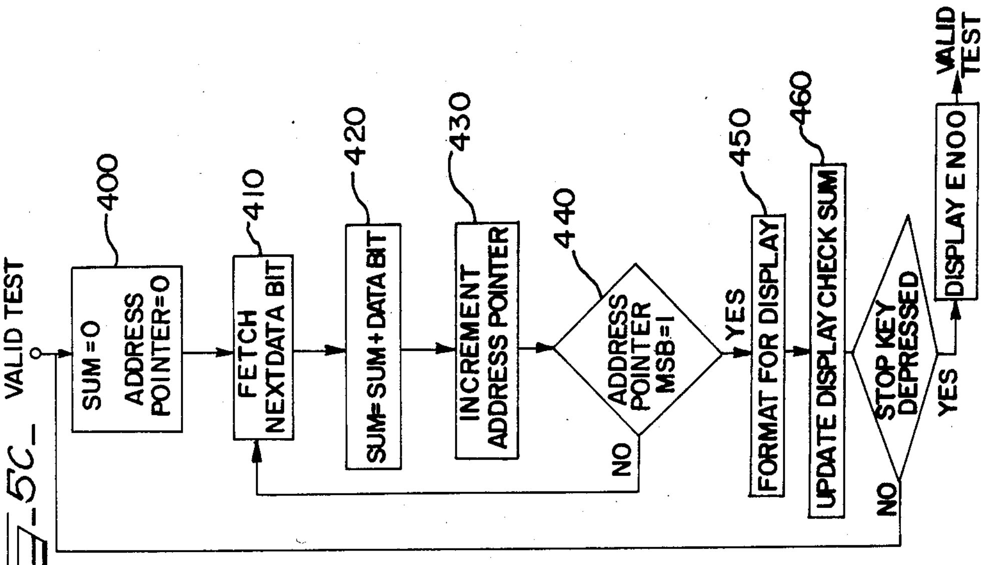
FIG. 5C is a flow diagram of a specific check sum diagnostic test program according to the invention.
Figure 5A:
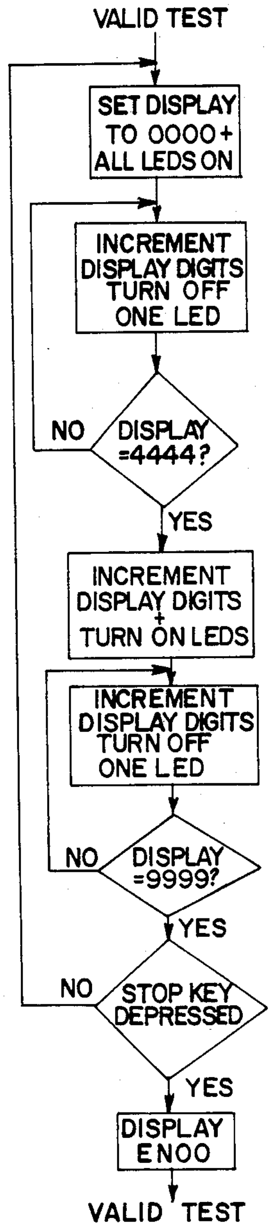
FIG. 5A is a flow diagram of a specific display diagnostic test program.
Figure 5D:
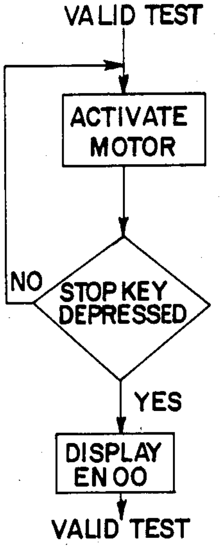
FIG. 5D is a flow diagram of a specific motor diagnostic test program.
Figure 5B:
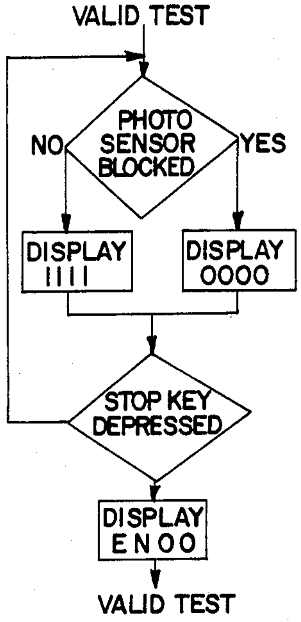
FIG. 5B is a flow program of a specific photosensor diagnostic test program.
Figure 5E:
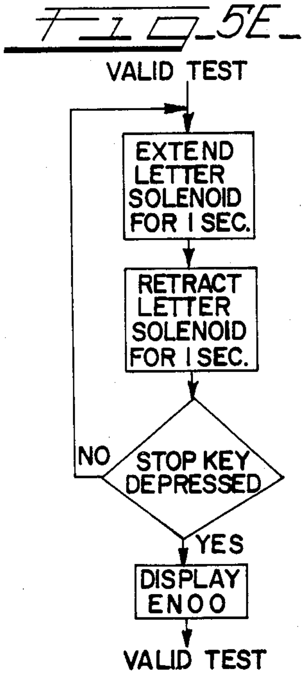
FIG. 5E is a flow diagram of a specific letter solenoid diagnostic test program.
Figure 5F:
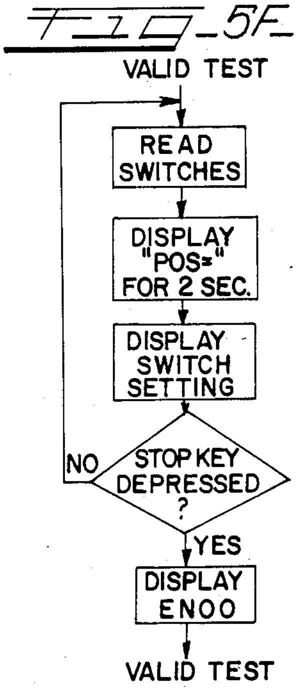
FIG. 5F is a flow diagram of a specific data switch position test program.

An optical sensor test is initiated by depressing the ink, stop, and start keys after first lifting the document transport belt to permit access to the photosensors (see FIGS. 5B). The operator may then test the sensor by alternatively inserting a document to block the sensor which will cause 0000 to be displayed, and removing the document from the document deck which will cause 1111 to be displayed. The stop key is depressed to end the test.

A check sum test is initiated by depressing the stop key twice followed by the start key which initiates a test which will display the sum of the contents of the PROM in hexadecimal form as the two least significant digits of the display with SU displayed in the two most significant digit positions. FIG. 5C illustrates a flow diagram of a program for performing the check sum test. This program would be performed at block 360 of FIG. 4. The program is entered at block 400 from the point following block 340 of FIG. 4 in the event that a valid test code has been entered. At block 400 an accumulator labelled SUM is set to zero and the address pointer is set to zero. Program flow then proceeds to block 410 where the data bit at the address of the address pointer is fetched from memory and then, as indicated at 420, this data bit is added to the value of the accumulator SUM to provide a new value of SUM. After the new SUM value has been calculated, program flow proceeds to block 430 where the address pointer is incremented and then the address pointer is tested as illustrated at 440, to determine if the most significant bit is equal to one. If the most significant bit is not equal to one, indicating that the full memory has not been summed, program flow proceeds back to block 410 where the process is repeated. However, if the most significant bit of the address pointer is equal to one, indicating that the summing process has been completed, program flow proceeds to block 450 where the SUM value is formatted for display on the LED display 112. The sum is then displayed as a hexadecimal value on the LED display as indicated at 460 and program control then passes to block 370 as indicated in FIG. 4. In an alternative approach, an expected value of the SUM is stored in memory and the calculated SUM is compared to the expected value. If a difference exists an error message is displayed, and if no difference is found, a message indicating a correct SUM is displayed.

A motor-on test is initiated by depressing the ink, clear, and start keys to initiate a test which runs the motor until the stop key is depressed (see FIG. 5D). A letter solenoid on/off test is initiated by first moving the meter select lever from the operate to the seal only position (i.e., disabling the meter) and then depressing the clear, ink and start keys (see FIG. 5E). The leter solenoid will be energized and deenergized every second verifying operation of the solenoid. A data switch position test is initiated by depressing the clear, stop and start keys. The display will then alternately display "POS=" (meaning "position equals") followed by the data value of the switch position in hexadecimal form (see FIG. 5F). Each test can be stopped by depressing the stop key.

The present invention is particularly directed to use in a mailing machine which will employ various features and functions, described in differing aspects, in any one or more of the following copending patent applications including this one, all filed concurrently on Jan. 18, 1985:

Ser. No. 692,753 to Linkowski for "PROGRAMMING INDICIA POSITION DELAY IN A MAILING MACHINE"; Ser. No. 692,751 to Linkowski for "DIAGNOSTIC TEST FOR PROGRAMMABLE DEVICE IN A MAILING MACHINE"; and Ser. No. 692,803 to Linkowski for "DIAGNOSTIC CONTROL KEYBOARD FOR A MAILING MACHINE".

A specific embodiment of the novel method and apparatus for diagnostic testing of the novel method and programmable device in a mailing machine has been described for the purposes of illustrating the manner in which the invention may be made and used. It should be understood that implementation of other variations and modifications of the invention in its various aspects will be apparent to those skilled in the art, and that the invention is not limited by the specific embodiment described. It is therefore contemplated to cover by the present patent any and all modifications, variations or equivalents of the invention that fall within the true spirit and scope of the basic underlying principles disclosed and claimed herein.

What is claimed is:

1. A method of performing a diagnostic test on the contents of a programmable device in an automatic mailing machine having a control panel which includes a visual display and plurality of keys including a test key for control of the mailing machines functions, during a normal mode of operation, the method comprising the steps of:

switching to a test mode in response to activating the test key on the control panel;

transforming the control panel to function as a test selection panel in response to switching to the test mode;

generating a password signal in response to activating a predetermined sequence of control panel keys;

generating a test code signal in response to activating a predetermined sequence of control panel keys;

summing the contents of the programmable device to obtain a total sum value only in response to switching to the test mode and generating the password signal and the test code signal; and, displaying the total sum value on the control panel display.

2. The method of claim 1 further comprising the step of comparing the total sum value to a predetermined check value and gathering an error signal in response to a difference.

3. The method of claim 1 further comprising the step of maintaining the total sum value on the control panel display until activation of a stop key and clearing the display in response to activation of the stop key.

4. Apparatus for diagnostic testing of the contents of a programmable device in an automatic mailing machine, the apparatus comprising:

control panel means, having a plurality of control keys and a visual display, for controlling the mailing machine functions in a normal mode of operation;

means for initiating a test mode in response to activating a selected key of the control panel means;

converting means for converting the control keys of the control panel to code entry keys in response to initiating the test mode;

means for summing the contents of the programmable device to obtain a total sum value responsive to initiation of the test mode;

means for monitoring the code entry keys to detect activation of a predetermined password sequence;

means for monitoring the code entry keys to detect activation of a predetermined test code sequence of code entry keys; and means for inhibiting summing in the absence of detection of the test code and password sequences.

5. The apparatus of claim 4 further comprising means for displaying a total sum value on the visual display.

6. The apparatus of claim 4 further comprising means for storing a preselected sum value, means for comparing the total sum value to the preselected sum value, and means for displaying an error indication on the visual display in response to a difference between the total sum value and the preselected sum value.

7. The apparatus of claim 4 further comprising means for returning to the normal mode of operation in response to detection of an invalid password sequence.

8. The apparatus of claim 4 further comprising means for storing a preselected sum value, means for comparing the total sum value to the preselected sum value, and means for displaying an error indication on the visual display in response to a difference between the total sum value and the preselected sum value.

9. The apparatus of claim 5 wherein the programmable device is a read only memory.

10. A mailing machine for use with a postage meter including a programmable device, said machine comprising:

document holding means for holding a plurality of documents for processing by the mailing machine;

document feeder means for feeding each document from the document holding means into the mailing machine;

document transport means for transporting each document from the document feeder means to the postage meter;

control panel means having a plurality of control keys and a visual display for permitting operator control of the mailing machine functions in a normal mode of operation;

means for initiating a test mode in response to activating a selected key of the control panel means;

converting means for converting the control keys of the control panel to code entry keys in response to initiating the test mode;

means for summing the contents of the programmable device to obtain a total sum value responsive to initiation of the test mode;

means for monitoring the code entry keys to detect activation of a predetermined password sequence;

means for monitoring the code entry keys to detect activation of a predetermined test code sequence of code entry keys; and means for inhibiting summing in the absence of detection of the test code and password sequences.

11. The mailing machine of claim 10 further comprising means for displaying the total sum value on the visual display.

12. The mailing machine of claim 10 further comprising means for storing a preselected sum value, means for comparing the total sum value to the preselected sum value, and means for displaying an error indication on the visual display in response to a difference between the total sum value and the preselected sum value.

13. The mailing machine of claim 17 further comprising means for returning to the normal mode of operation in response to detection of an invalid password sequence.

* * * * *

UNITED STATES PATENT AND TRADEMARK OFFICE

CERTIFICATE OF CORRECTION

PATENT NO. : 4,644,541

DATED : February 17, 1987

INVENTOR(S) : William J. Linkowski

It is certified that error appears in the above—identified patent and that said Letters Patent is hereby corrected as shown below:

Column 1, line 56; "predetermined" should be--preselected--.

Column 3, line 56; "wire" should be--write--.

Column 8, line 57; "17" should be--10--.

Signed and Sealed this

Twenty-seventh Day of October, 1987

*Attest:*

DONALD J. QUIGG

*Attesting Officer* *Commissioner of Patents and Trademarks*